United States Patent [19]

Kinoshita et al.

[11] Patent Number: 5,779,014
[45] Date of Patent: Jul. 14, 1998

[54] ONE-WAY CLUTCH MOUNTING STRUCTURE

[75] Inventors: Yoshio Kinoshita, Shizuoka-ken; Toshio Awaji; Takashi Miura, both of Fukuroi, all of Japan

[73] Assignee: NSK-Warner Kabushiki Kaisha, Tokyo, Japan

[21] Appl. No.: 748,157

[22] Filed: Nov. 12, 1996

Related U.S. Application Data

[63] Continuation of Ser. No. 356,439, Dec. 15, 1994, abandoned.

[30] Foreign Application Priority Data

Dec. 17, 1993 [JP] Japan ................... 5-317235

[51] Int. Cl.[6] ................... F16D 41/00; F16D 33/00
[52] U.S. Cl. ................... 192/41 R; 192/45.1; 60/345; 188/82.8
[58] Field of Search ................... 192/3.21, 3.25, 192/41 R, 115, 3.34, 41.5, 45; 403/343, 342, 306; 60/345; 188/82.8, 82.84

[56] References Cited

U.S. PATENT DOCUMENTS

| 2,994,197 | 8/1961 | Mamo | 60/345 |
| 3,665,707 | 5/1972 | Koivunen | 60/345 |
| 4,203,288 | 5/1980 | Nichols | 60/345 |
| 4,362,419 | 12/1982 | Duncan | 403/343 |
| 4,441,315 | 4/1984 | Bochot | 192/3.21 X |
| 4,863,353 | 9/1989 | Manninen | 403/343 X |
| 4,949,821 | 8/1990 | Murota et al. | 192/3.21 |
| 5,133,617 | 7/1992 | Sokn et al. | 403/343 X |
| 5,168,702 | 12/1992 | Sakakibara et al. | 60/345 |
| 5,282,362 | 2/1994 | Renneker et al. | 60/345 |
| 5,366,314 | 11/1994 | Young | 403/343 X |

FOREIGN PATENT DOCUMENTS

| 489371 | 1/1954 | Italy | 60/345 |

*Primary Examiner*—Richard M. Lorence
*Attorney, Agent, or Firm*—Skjerven Morrill MacPherson Franklin & Friel LLP; Thomas S. MacDonald

[57] ABSTRACT

A one-way clutch includes an outer ring 8, an inner ring 9 and a plurality of clutch members 10 interposed between the outer and inner rings 8 and 9. The present invention provides a one-way clutch mounting structure by having the outer ring of one-way clutch mounted in a housing, which may be a part of stator 5 of a torque converter 2. In accordance with the present invention, the housing has an annular section and a side section which together define a pocket in which the outer ring 8 is mounted. The outer ring 8 has an outer peripheral surface formed with a spiral groove 8c and the annular section of the housing partly extends into the spiral groove 8c when casted.

8 Claims, 5 Drawing Sheets

5,779,014

1

ONE-WAY CLUTCH MOUNTING STRUCTURE

This application is a continuation of application Ser. No. 08/356,439, filed Dec. 15, 1994, now abandoned.

BACKGROUND OF THE INVENTION

1. Field of the Invention

This invention relates to a structure for mounting a one-way clutch, and, in particular, to a one-way clutch mounting structure for use in a torque converter or the like.

2. Description of the Prior Art

FIG. 2 schematically illustrates an example of torque converter in which a one-way clutch is incorporated and for which the present invention can be advantageously applied. As shown in FIG. 2, a driver plate 1 which receives a rotational force from a prime mover, such as an internal combustion engine (not shown), is fixedly coupled to a torque converter 2 so that the rotational force is transmitted to the torque converter 2. The torque converter 2, in general, includes a pump impeller 3, which is operatively coupled to the driver plate 1; a turbine runner 4, which is operatively coupled to the pump impeller 3 through a working fluid; a stator 5, which guides a flow of the working fluid between the pump impeller 3 and the turbine runner 4; an output shaft 6, which rotates together with the turbine runner 4; and a stationary shaft 7, which is hollow and coaxial with the output shaft 6. The torque converter 2 also includes a one-way clutch comprised of an outer ring 8, an inner ring 9, a plurality of clutch members 10, such as sprags or rollers, interposed between the outer and inner rings 8 and 9, and a pair of retainers 11 and 12 for retaining the clutch members 10 in position between the outer and inner rings 8 and 9.

Typically, the stator 5 is made of an aluminum alloy by a die casting method or of a plastic material by an injection molding method. On the other hand, the outer ring 8 is typically made of a carbon steel material or the like for use as a mechanical structure.

FIGS. 3a through 3b illustrate an example of the prior art structure for mounting a one-way clutch in a torque converter. As best shown in FIG. 3a, an outer ring of a one-way clutch is provided with a plurality of notches 8a in its outer peripheral surface. Thus, the stator 5 of the torque converter 2 is provided with a plurality of inwardly projecting projections arranged along its internal circumference so that these projections may be fitted into the respective notches 8a when the outer ring 8 is assembled into the stator 5 as shown in FIG. 3c. As a result, when so mounted, the outer ring 8 is prevented from rotating relative to the stator 5 because both of them are integrated together as far as rotation around the rotating axis of the outer ring 8 is concerned. In this case, however, in order to secure a fitting accuracy between the inner diameter of the stator 5 and the outer diameter of the outer ring 8, the processing cost tends to be pushed up. Besides, since the thickness of the outer ring 8 tends to increase due to design considerations, the overall size of the one-way clutch tends to become larger. Accordingly, it is not possible to adopt a compact design.

FIGS. 4a through 4d illustrate another example of the prior art structure for mounting a one-way clutch in a torque converter. In this example, the stator 5 has a smooth inner peripheral surface for receiving therein an outer ring of a one-way clutch. On the other hand, serration 8b is provided on the outer peripheral surface of outer ring 8, and the outer ring 8 is press-fitted into the stator 5. In this case, however, although the outer diameter of the outer ring 8 may be

2 limited as compared with the above-described prior art example, the thickness of that section of the stator 5 which holds the outer ring 8 cannot be made too small. This is because, if this thickness is made too small, then the stator 5 may be deformed or damaged in severe cases when the outer ring 8 is press-fitted into the stator 5. Besides, since a knurling process is required for providing serration 8b on the outer peripheral surface of the outer ring 8 and a press-fitting operation is also required in assembling the outer ring 8 into the stator 5, the processing cost tends to be high in this example.

SUMMARY OF THE INVENTION

In accordance with the present invention, there is provided a structure for mounting a one-way clutch including an outer ring, an inner ring and a plurality of clutch members interposed between said outer and inner rings, comprising:

a housing having a pocket for receiving therein said outer ring of said one-way clutch; and spiral engaging means provided between said pocket and said outer ring, said spiral engaging means extending spirally with respect to a center axis of said outer ring.

Preferably, the spiral engaging means includes a spiral groove or projection, continuous or not continuous, provided in an outer peripheral surface of the outer ring. Thus, if the housing is formed from a casting material by die casting or the like, the outer ring may be integrally formed as an insert so that, in the case of a spiral groove, a part of the housing fills the spiral groove of the outer ring when casted to thereby provide an integrated structure between the housing and the outer ring. On the other hand, in the case of a spiral projection, it will project into the housing when the housing is casted from a casting material. The housing is preferably a part of the stator of a torque converter.

Preferably, the pocket of the housing has an inner circumferential surface, which contacts the outer peripheral surface of the outer ring when assembled, and an inner side surface, which extends radially inwardly from one end of the inner circumferential surface and which serves as a stopper wall against the outer ring. Thus, with this structure, when the outer ring receives a rotational force in a predetermined direction of rotation, the outer ring has a tendency to be pushed against the inner side surface of the housing which serves as a stopper wall.

It is therefore a primary object of the present invention to provide an improved structure for mounting a one-way clutch.

Another object of the present invention is to provide an improved one-way clutch mounting structure simple in structure and low in manufacturing cost.

A further object of the present invention is to provide an improved one-way clutch mounting structure compact in size and high in durability.

Other objects, advantages and novel features of the present invention will become apparent from the following detailed description of the invention when considered in conjunction with the accompanying drawings.

BRIEF DESCRIPTION OF THE DRAWINGS

FIG. 1b is a schematic illustration showing in side view the outer ring of FIG. 1a;

Figure 1A:
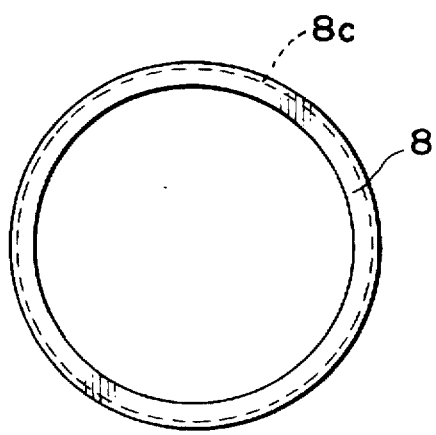
FIG. 1a is a schematic illustration showing in front view an outer ring of a one-way clutch constructed in accordance with one embodiment of the present invention.
Figure 1B:
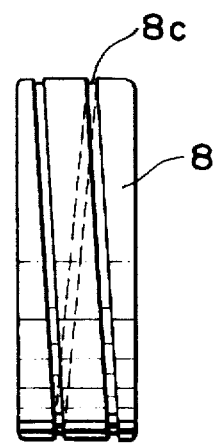
Figure 1C:
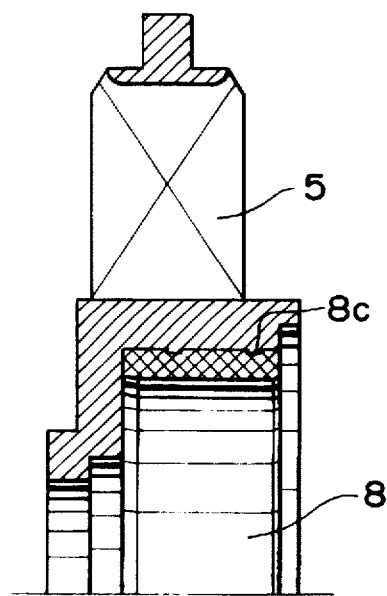
FIG. 1c is a schematic illustration showing in cross section the condition at a step during a process for manu-
Figure 1D:
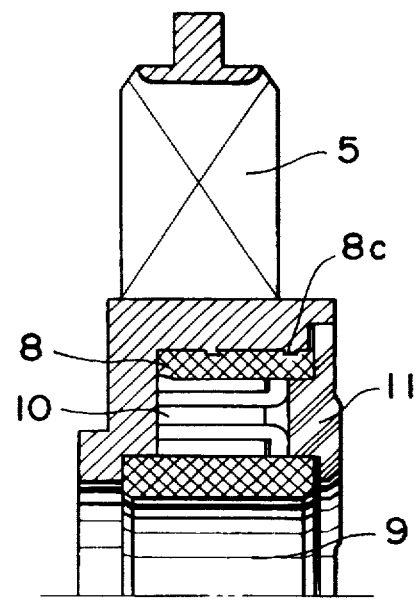
Figure 2:
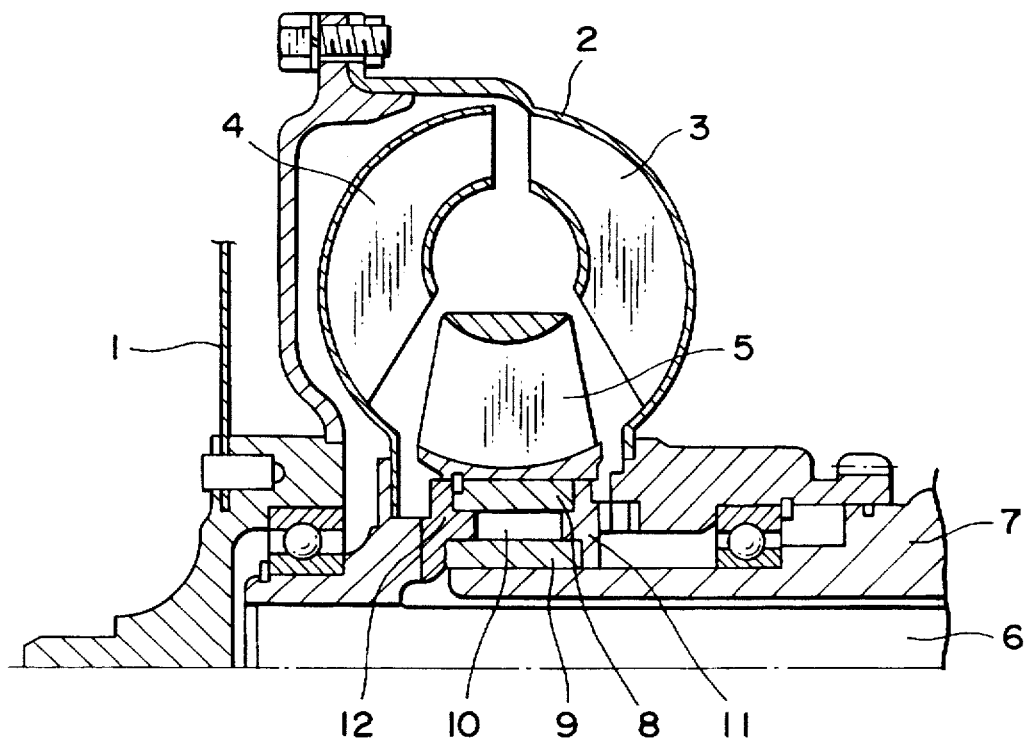
Figure 3A:
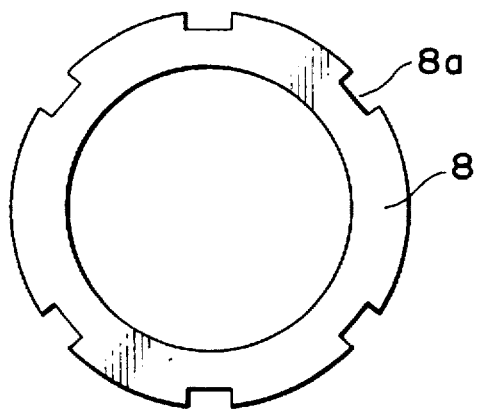
Figure 3B:
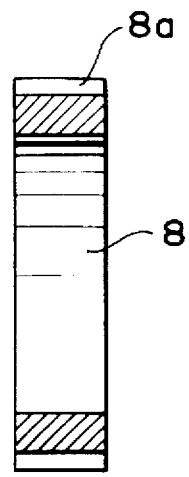
Figure 3C:
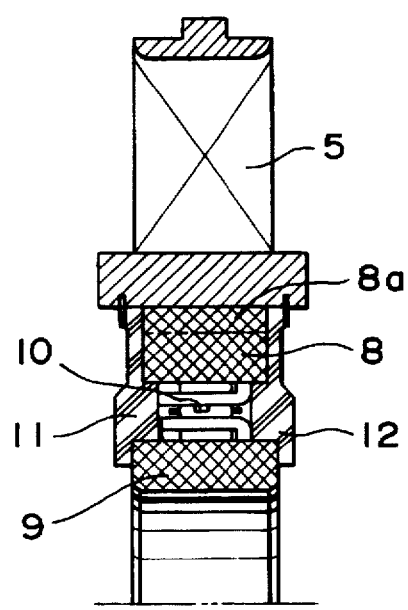
Figure 4A:
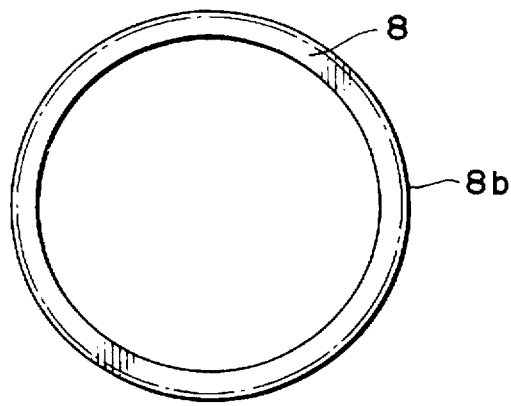
Figure 4B:
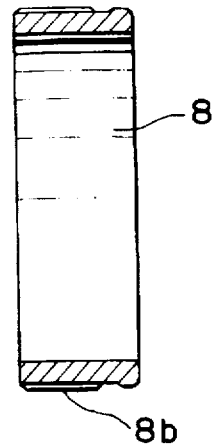
Figure 4C:
Figure 4D:
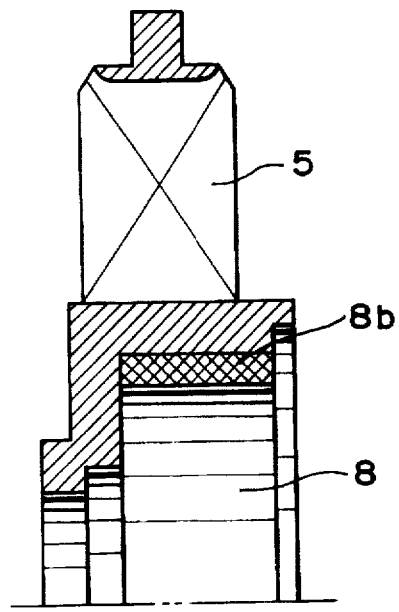
Figure 5:
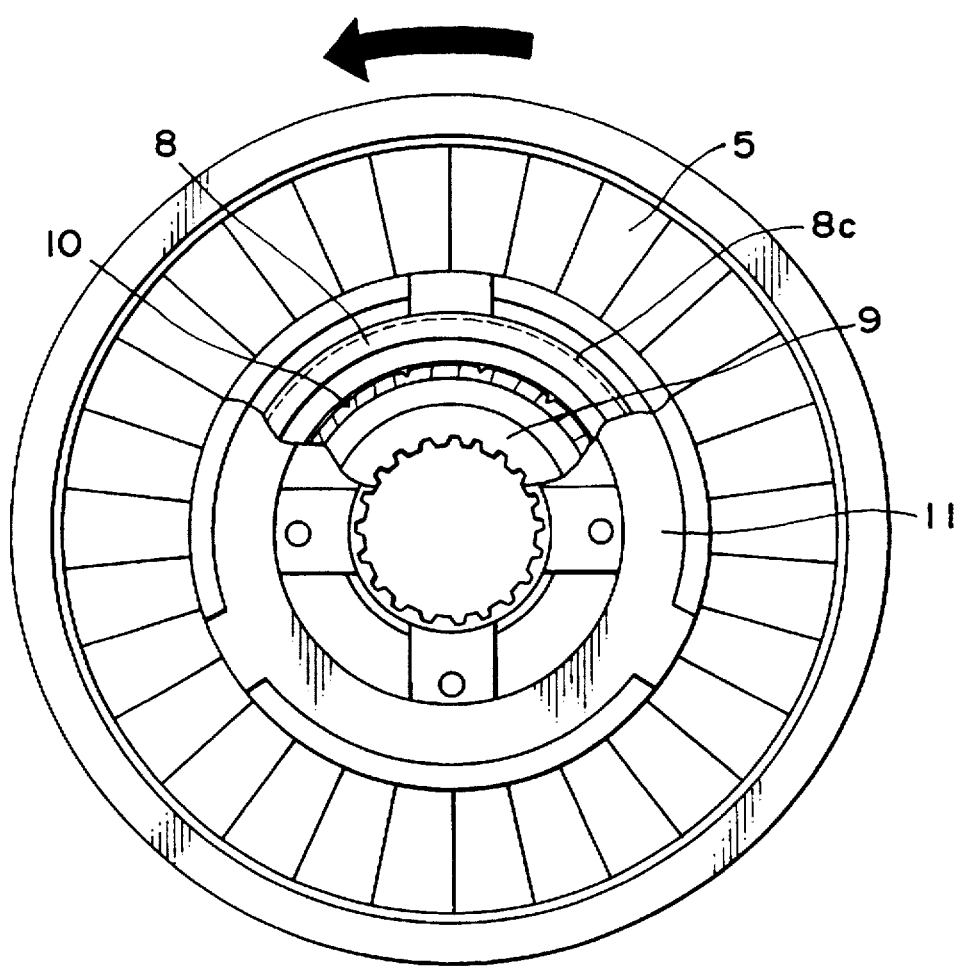

3 facturing a one-way clutch mounting structure in accordance with one embodiment of the present invention;

FIG. 1d is a schematic illustration showing in cross section the condition at another step after the step shown in FIG. 1c;

FIG. 2 is a schematic illustration showing in cross section the overall structure of a torque converter incorporating therein a one-way clutch, for which the present invention may be advantageously applied;

FIG. 3a is a schematic illustration showing in front view an example of the prior art outer ring for use in a one-way clutch;

FIG. 3b is a schematic illustration showing the longitudinal cross section of the outer ring shown in FIG. 3a;

FIG. 3c is a schematic illustration showing in cross section an example of the prior art one-way clutch mounting structure using the outer ring shown in FIGS. 3a and 3b;

FIG. 4a is a schematic illustration showing in front view another example of the prior art outer ring for use in a one-way clutch;

FIG. 4b is a schematic illustration showing the longitudinal cross section of the outer ring shown in FIG. 4a;

FIG. 4c is a schematic illustration showing part of the outer ring shown in FIGS. 4a and 4b on an enlarged scale;

FIG. 4d is a schematic illustration showing in cross section another example of the prior art one-way clutch mounting structure using the outer ring shown in FIGS. 4a through 4c; and FIG. 5 is a schematic illustration which is useful for explaining the function of the present invention.

DESCRIPTION OF THE PREFERRED EMBODIMENTS

Referring now to FIGS. 1a and 1b, there is schematically shown an outer ring 8 of a one-way clutch constructed in accordance with one embodiment of the present invention for use in a torque converter or the like. The outer ring 8 has a smooth inner peripheral surface and an outer peripheral surface which is formed with a spiral groove 8c. In the illustrated example, the spiral groove 8c is a right-hand screw so that the spiral groove 8c advances forward or leftward in FIG. 1b when it is rotated clockwise around its longitudinal axis. The spiral groove 8c may be easily provided on the outer peripheral surface of the outer ring 8, for example, by a common turning process.

In the illustrated example, since the outer peripheral surface of outer ring 8 is not required of high accuracy when assembling the outer ring 8 into its associated stator 5, the outer peripheral surface of outer ring 8 may be on the order of a forged surface of a raw material. That is, in accordance with the present invention, after the outer surface of outer ring 8 may be defined by forging and the spiral groove 8c may be provided by turning thereafter. Thus, the outer ring 8 can be manufactured with ease so that the present invention can be put into practice economically.

After forming the outer ring 8 as shown in FIGS. 1a and 1b, the outer ring 8 is integrally formed with a stator 5 as shown in FIG. 1c, for example, by casting or molding. That is, the outer ring 8 is placed at a predetermined position in a mold cavity and then a casting material is poured into the mold cavity, so that the resulting structure is an assembly between the outer ring 8 and the stator 5 as shown in FIG. 1c.

In this case, the stator 5 has a housing which defines a pocket for receiving and holding therein the outer ring 8. The

4 housing has an annular section, which defines an inner peripheral surface, and a side section, which extends radially inwardly over a predetermined length from one side of the annular section. Thus, the pocket is defined by the inner peripheral surface of the annular section of the housing and an inner side surface of the side section of the housing. Preferably, the side section of the housing of the stator 5 is long enough to hold a portion of the inner ring 9 of one-way clutch as best shown in FIG. 1d. In this case, the side section of the housing should be formed with a notch for receiving and holding therein a portion of the inner ring 9. It should also be noted that the side section of the housing also serves as a retainer for retaining the clutch members 10 in position at one side of the outer ring 8.

As shown in FIG. 1c, when the stator 5 is formed by casting with the outer ring 8 placed in a casting mold, the stator 5 thus casted, partly fills the spiral groove 8c of outer ring 8, so that the outer ring 8 is integrated with the stator 5 as a unit. In addition, the left-hand side of outer ring 8 when viewed in FIG. 1c is in intimate contact with the inner side surface of the side section of the housing of stator 5 thus casted. As a result, if the outer ring 8 receives an externally applied clockwise rotationary force while the stator 5 is held immovably, the outer ring 8 tends to advance toward left in FIG. 1c so that the outer ring 8 tends to be pushed against the side section of the housing of stator 5. In other words, as the outer ring 8 receives a clockwise rotational force, there is a tendency to keep the outer ring 8 to be strongly integrated with the stator 5.

Then, a plurality of clutch members 10, such as sprags or rollers, an outer ring 9 and a retainer 11 are assembled as shown in FIG. 1d to complete the assemblage of a one-way clutch in the housing section of stator 5. With the structure shown in FIG. 1d, when a rotating force is externally applied to the stator 5 in the counterclockwise direction as shown by an arrow in FIG. 5, then the outer ring 8 and the inner ring 9 are locked by the clutch members 10 so that the stator 5 and the outer ring 8 do not rotate in the counterclockwise direction. Under the condition, since the outer ring 8 is prevented from rotating in the counterclockwise direction and the stator receives a rotating force in the counterclockwise direction, the outer ring 8, in effect, is forced to pushed against the side section of the housing of stator 5.

On the other hand, when the stator 5 receives a rotating force in the clockwise direction, the outer ring 8 and the inner ring 9 are set in its unlocked state so that the outer ring 8 can rotate in the clockwise direction freely. Since the outer ring 8 can execute a free rotational motion under the condition, the outer ring 8 is not slipping off the stator 5 when the outer ring 8 rotates in the clockwise direction.

While the spiral groove 8c has been provided in the above-described embodiment, various modifications and alterations are possible without departing from the scope of the present invention. For example, a spiral projection or ridge which projects radially outwardly from the outer peripheral surface of outer ring 8 may be provided in place of spiral groove 8c. The spiral groove 8c may be provided more than one, if desired. The depth and width of such a spiral groove 8c may be determined appropriately by one skilled in the art depending on various applications. Besides, the spiral groove 8c may be continuous or intermittent in shape and it may be straight or curved.

While the above provides a full and complete disclosure of the preferred embodiments of the present invention, various modifications, alternate constructions and equivalents amy be employed without departing from the true spirit and scope of the invention. Therefore, the above description and illustration should not be construed as limiting the scope of the invention, which is defined by the appended claims.

What is claimed is:

1. In combination, a one-way clutch including an outer ring, an inner ring and a plurality of clutch members interposed between said outer and inner rings;

a housing having a pocket for receiving therein said outer ring of said one-way clutch, said housing including an annular section having an inner peripheral surface and a side section which extends radially inwardly from one side of said annular section to thereby define an inner side surface, wherein said pocket is defined by said inner peripheral surface of said annular section and said inner side surface of said side section;

spiral engaging means for integrating said housing on said outer ring and being provided between said housing and said outer ring without a gap therebetween, said spiral engaging means extending spirally with respect to a center axis of said outer ring and having a uniform width; and wherein, when said housing is integrated with said outer ring, said outer ring is in abutment with said inner side surface of said housing and a spiral engagement is obtained between said housing and said outer ring along an entire length of said spiral engaging means such that said outer ring tends to be pushed against said inner side surface of said housing when said outer ring receives a torque transmitted from said inner ring through said plurality of clutch members in a clutched condition.

2. The structure of claim 1, wherein said annular and side sections are integrally formed.

3. The structure of claim 1, wherein said spiral engaging means includes a spiral groove formed in an outer peripheral surface of said outer ring.

4. The structure of claim 3, wherein said housing includes a portion which extends into said spiral groove of said outer ring.

5. The structure of claim 4, wherein said housing is a part of a stator of a torque converter.

6. The structure of claim 3 wherein said housing forms an integral connection to said spiral groove.

7. The structure of claim 6 wherein said integral connection is a cast or molded connection filling in said spiral groove.

8. In combination, a one-way clutch including an outer ring, an inner ring and a plurality of clutch members interposed between said outer and inner rings;

a housing having a pocket for receiving therein said outer ring of said one-way clutch;

spiral engaging means for securely holding said housing on said outer ring and being provided between said housing and said outer ring without a gap therebetween, said spiral engaging means extending spirally with respect to a center axis of said outer ring and having a uniform width; and wherein said spiral engaging means includes a spiral groove formed in an outer peripheral surface of said outer ring and wherein said housing includes a cast or molded connection filling in said spiral groove for integrating said housing to said outer ring.

* * * * *